United States Patent

Kubota

[11] 3,869,196
[45] Mar. 4, 1975

[54] LIQUID CRYSTAL DISPLAY DEVICE
[75] Inventor: Kanemitsu Kubota, Suwa, Japan
[73] Assignee: Kabushiki Kaisha Suwa Seikosha, Tokyo, Japan
[22] Filed: Jan. 9, 1974
[21] Appl. No.: 432,117

[30] Foreign Application Priority Data
Jan. 11, 1973   Japan................................ 48-6090

[52] U.S. Cl............................. 350/160 LC, 350/150
[51] Int. Cl.................................................. G02f 1/16
[58] Field of Search ............... 350/150, 155, 160 LC

[56] References Cited
UNITED STATES PATENTS
3,731,986   5/1973   Ferguson ............................ 350/150

*Primary Examiner*—Edward S. Bauer
*Attorney, Agent, or Firm*—Blum Moscovitz Friedman & Kaplan

[57] ABSTRACT

In a liquid crystal display device using liquid crystal material to rotate the plane of polarized light by 90° both the thickness and the loss of light by reflection are decreased by using one surface from each of a polarizer and an analyzer for forming a cell in which the liquid crystal material is confined. The reduction in thickness is particularly important where the cell must be minimized in thickness to make it suitable for inclusion in a restricted space such as in a wrist watch.

2 Claims, 5 Drawing Figures

PATENTED MAR 4 1975 3,869,196

LIQUID CRYSTAL DISPLAY DEVICE

BACKGROUND OF THE INVENTION

Conventional electric display means have included nixie tubes, light-emitting diodes, Braun tubes and fluorescent tubes. However, such conventional dispaly means require substantial currents, a feature which makes them comparatively unsuitable for use in battery-powered devices, and, in particular, in battery-powered wrist watches.

Liquid crystal display devices have advantages over the conventional electric display means in that the power needed for display is extremely small, the thickness, in general, is less, making it possible to miniaturize liquid crystal display devices, and they function through the use of ambient light, so that the information displayed is readily discerned even in regions of higher ambient light level.

As aforenoted, a particular advantage of liquid crystal display devices is the fact that a cell containing liquid crystal material can be quite thin. However, when a cell containing liquid crystal material is used in combination with a polarizer and an analyzer problems are introduced. Polarizers consisting of polarizing material between thin sheets of plastic are inferior optically, due to the fact that thin, optically-flat plastic sheet is not available. The optical properties of the polarizer and analyzer members can be improved by sandwiching the polarizing material between sheets of glass. However, the minimum thickness for such sheets, where the thickness is sufficient to give appropriate strength to the ensemble is about 0.5 mm and the total thickness must be over 1.0mm. Consequently, the use of glass-sandwiched polarizer and analyzer members in combination with a liquid crystal cell results in an objectionably thick assembly.

SUMMARY OF THE INVENTION

A polarizer member and an analyzer member, each being of the glass-sandwich type, are each provided on one surface thereof with suitably disposed transparent conductive films of the type used for forming images or indicia in liquid crystal electric displays. The polarizer and analyzer are treated by known means so that when mounted opposite each other with the polarization axes at 90° to each other they form opposite walls of a cell into which can be inserted liquid crystals of a type which will rotate the plane of polarization by 90° in the absence of an electric field. Consequently, in the absence of an electric field, light which has passed through the polarizer traverses the entire assembly.

When an electric field is applied to the conductive films on the interior walls of the cell, that portion of the liquid crystal material in the field becomes optically inactive. As a result, in the regions where light from the polarizer traverses that portion of the liquid crystal material on which is imposed an electric field, the plane of polarization of the light will not be rotated, and consequently, light will be blocked from traversing the analyzer. Consequently, to the viewer, portions of the cell will appear to be dark and other portions will appear to be light.

In a preferred embodiment, a white light-diffusing sheet is placed against the exterior surface of the analyzer member.

Accordingly, an object of the present invention is an improved liquid crystal display device comprising a polarizer and an analyzer in which the optical quality is increased and the thickness is decreased.

Another object of the present invention is a liquid crystal display device comprising a polarizer and an analyzer in which the walls of the cell are formed by glass sheet portions of the polarizer and analyzer.

A further object of the present invention is an improved liquid crystal display device comprising a polarizer and an analyzer in which the number of reflective surfaces is decreased, thereby increasing the intensity of the display produced by said device.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENT

Figure 1:
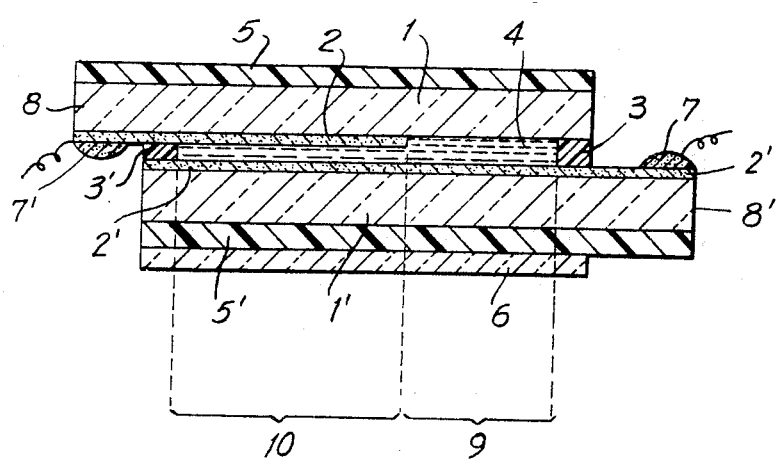
FIg. 1 is a sectional view of a liquid crystal display device utilizing a polarizer and an analyzer in accordance with the prior art.

An eample of a liquid crystal display cell in combination with polarizer and analyzer members in accordance with the prior art is shown in FIG. 1. Transparent glass plates 1 and 1' form the cell itself. The inner surfaces of the transparent glass plates are coated with transparent conductive films 2 and 2', the combination of glass plate 1 and conductive film 2 and glass plate 1' and conductive film 2' forming upper and lower electrode plates 8 and 8'. Spacers 3 and 3' may be of polyester or of any suitable inert material. These spacers determine the gap between electrode plates 8 and 8'. Liquid crystal material 4' is sandwiched between the upper and lower electrode plates 8 and 8'.

Prior to assembly of the upper and lower electrode plates to form a liquid crystal cell, the plates are treated by known means so that when a suitable liquid crystal material is placed therebetween, the liquid crystal material will rotate the plane of polarization of polarized light by 90°. An appropriate treatment of the plates for achieving this result is to rub each of the plates in a single direction with a material such as cotten. The plates are then mounted so that the direction of rubbing of the two plates differs by 90°. The liquid crystal material must be of such a type that when mounted between the plates, plane-polarized passing therethrough, in the absence of an electric field, will be rotated by 90°. A number of liquid crystal materials having this characteristic are known.

In the example of FIG. 1, plastic linear polarizing plates 5 and 5' are used. They are mounted so that the axes of polarization are at right-angles to each other. The plastic linear polarizing plates are attached to electrode plates 8 and 8' by means of a transparent cement.

Attached to the outer surface of the analyzer plate 5' is a white light-scattering plate 6. Lead terminals 7 and 7' are provided for connecting transparent conductive films 2 and 2' to an outside source of voltage.

In the example shown in region 1 electrode plate 8 lacks conductive film in the regin designated by the reference numeral 9. In the absence of an electric field, the plane of polarization of light entering the cell through polarizer 5 is rotated through 90° over the entire cross-section of the cell, so that regions 9 and 10 are of equal intensity as viewed from below the cell. However, if a sufficient voltage, i.e., electric field is applied between films 2 and 2' the optical activity of liquid crystal 4 in portion 10 of the cell will be lost. Consequently, the plane polarized light entering the cell will not be rotated in region 10 and will not traverse analyzer 5', as the result of which region 10 will appear dark. However, since no field is applied between electrode plates 8 and 8' in region 9, the optical activity of the liquid crystal material 4 in this portion of the cell will be retained so that the plane of polarization of the light entering the cell through the polarizer 5 will be rotated by 90° and will traverse analyzer 5'. Consequently, region 9 will appear bright to the viewer and the contrast between regions 9 and 10 will be sufficient for discrimination of images or indicia. As is evident, conductive film 2 may be of any shape desired and may consist of segments, each of which is selectively connectable to a voltage source.

Figure 2:
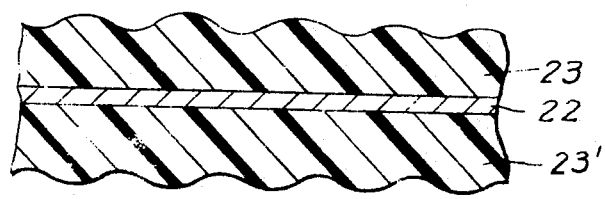
FIG. 2 is a sectional view of a polarizer having plastic sheets on opposite faces of a polarizing means.

The liquid crystal display device of FIG. 1 has a number of defects. The surfaces of the thin plastic sheets used in making the plastic polarizing plates are irregular as shown schematically in enlarged scale in FIG. 2 where polarizing means 22 is sandwiched between plastic sheets 23 and 23'. As a result, the light traversing the sheet is refracted non-uniformly, seriously degrading the sharpness of the image produced by the device. Further with respect to plastic polarizing plates, the moisture-resistance of this type of plastic polarizing means is poor so that the life of such a sheet in actual use is limited to about two years.

Figure 3:
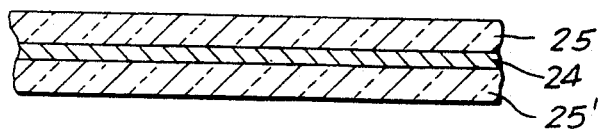
FIG. 3 is a sectional view of a polarizer having glass sheets on opposite faces of a polarizing means.
Figure 4:
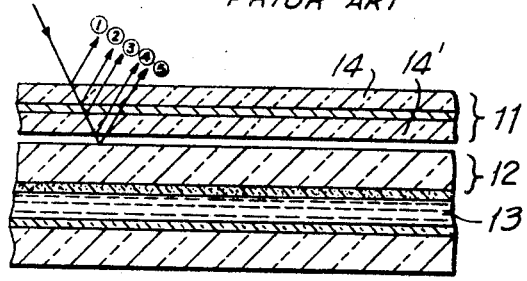
FIG. 4 is a sectional view of a liquid crystal display cell in accordance with the prior art in combination with a glass-sheet polarizer as shown in FIG. 3.

In the polarizer of FIG. 3, a polarizing film 24 is sandwiched between transparent glass plates 25 and 25'. These plates can be quite flat so that the distortion and the short lift of the plastic polarizing plates are avoided. However, the use of a glass plate polarizer results in there being five planes of reflection for the polarizer and five planes for the analyzer. As shown in FIG. 4, glass polarizing plate 11 is the type which is commercially available. Upper electrode plate 12 corresponds to 8 of FIG. 1. Liquid crystal material 13 corresponds to 4 of FIG. 1. Commercially available glass polarizing plates consist of two transparent glass sheets 14 and 14' each of which must be at least 0.5 mm in order to have adequate mechanical strength for processing during manufacture. Consequently, the overall thickness of a glass polarizing plate must be at least 1mm. Since both upper and lower polarizing plates are used in combination, the total thickness of the polarizing plates must be in excess of 2mm. This is a serious disadvantage where such a display is to be used in a restricted region such as in a wrist watch. As is well known, the value of a wrist watch increases as its thickness decreases. Furthermore, the total of 10 planes of reflection involved in the combination of two glass polarizing plates with a liquid crystal cell seriously degrades the display.

Figure 5:
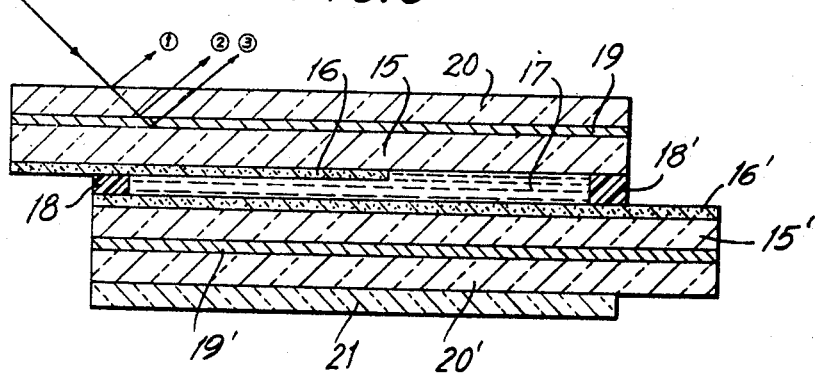
FIG. 5 is a sectional view of a liquid crystal display cell in combination with glass sheet polarizer and analyzer in accordance with the present invention.

The way in which these disadvantages are overcome is shown in FIG. 5 where 15 and 15' are the glass plates which make up a liquid crystal cell containing liquid crystal material 17. Spacers 18 and 18' of polyester film or any other suitable insulating gasket material establish the gap between the upper and lower electrode plates. Liquid crystal material 17 is held in the gap between the upper and lower plates. Polarizing films 19 and 19' together with exterior plates 20 and 20' make up the polarizer and analyzer plates respectively.

As in FIG. 1, the axes of the polarizer and analyzer plates are at right-angles, and the interior surfaces of plates 15 and 15' have been appropriately treated so that in combination with a suitable liquid crystal material 17 as aforenoted, rotation of the plane of polarized light entering the cell through the polarizer through an angle of 90° will occur. Further, conductive transparent film 16 is deposited on selected regions of glass plate 15 and conductive transparent film 16' is deposited on the interior surface of glass plate 15'.

The operation of the cell shown in FIG. 5, including the effect of white light-scattering sheet 21 at the exterior of glass sheet 20' is similar to that of the cells shown in FIG. 1. However, as can be seen, the number of reflecting surfaces for each of the polarizing plates is diminished by two, as the result of which the total number of reflecting surfaces is decreased from ten to six, thereby substantially improving the contrast of the images produced by the display. Also, the use of glass polarizing plates as the walls of a liquid crystal display cell as shown in FIG. 5 decreases the overall thickness of the system and eliminates the deterioration by humidity to which plastic polarizers are subject.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention, which as a matter of language, might be said to fall therebetween.

What is claimed is:

1. In a liquid crystal display device wherein liquid crystals in a cell formed of opposed glass plates rotate the plane of polarization of linearly polarized light through 90° in the absence of an electric field across said cell and which are non-rotatory in the presence of a sufficiently strong electric field, said cell having suitably disposed transparent conductive elements on the inner surfaces of said glass plates covering only part of said surfaces, said cell further having polarizer and analyzer members disposed with axes at right angles to each other exterior to either plate of said cell, the improvement wherein each of said polarizer and analyzer members comprises a polarizing film held firmly between inner and outer sheets of glass and said cell comprises the inner sheet of each of said polarizer and analyzer members.

2. The improvement as defined in claim 1 wherein a white light-scattering plate is disposed proximate the outer sheet of said analyzer member in a position such that light transmitted through said analyzer member impinges on said light-scattering plate.

* * * * *